March 12, 1957 J. H. WENTZIEN ET AL 2,784,776
WHEEL MOUNTED GUARD FOR TIRE INFLATION
Filed April 8, 1954
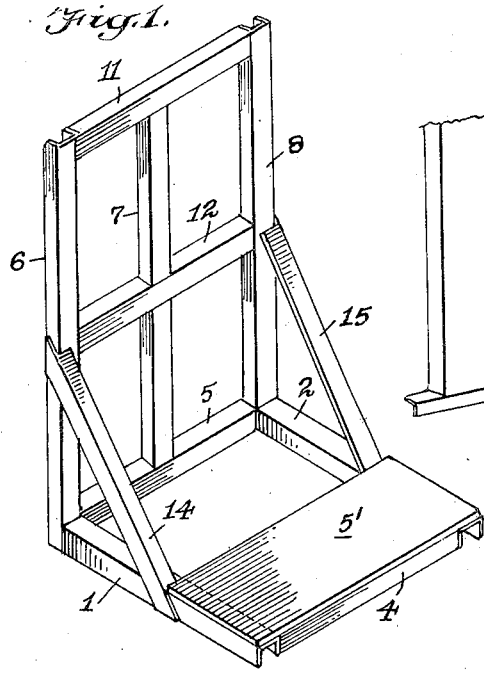
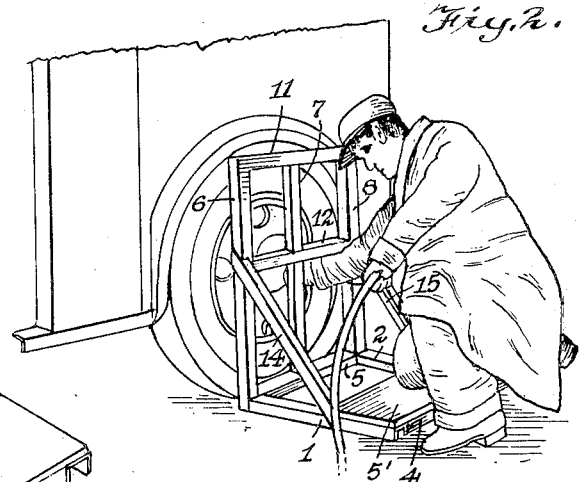
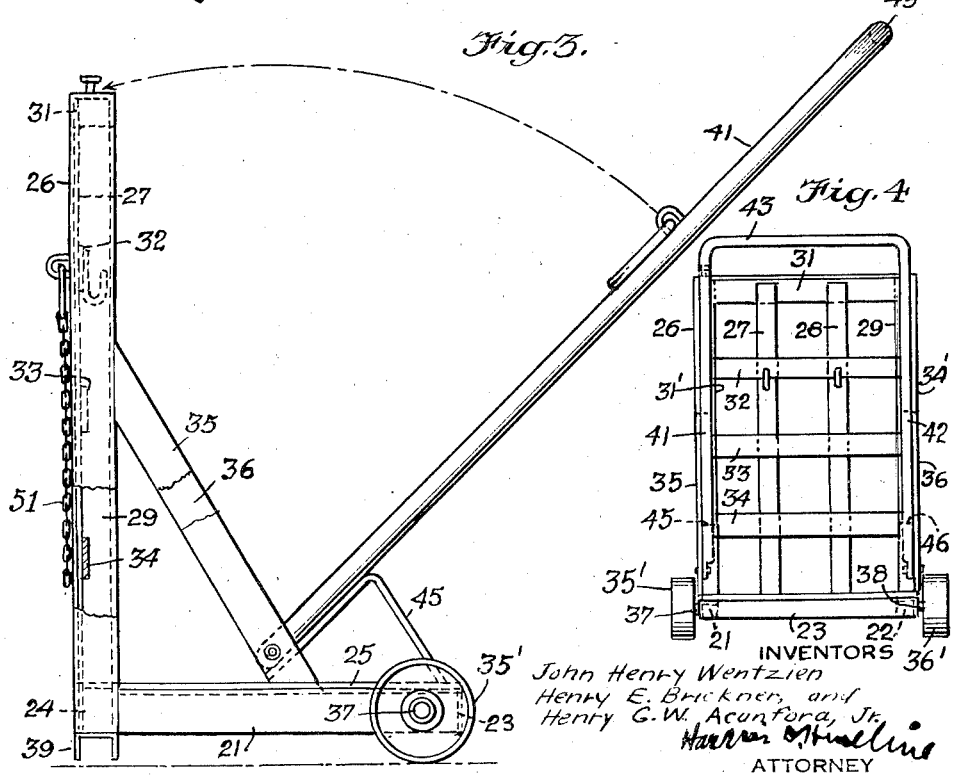
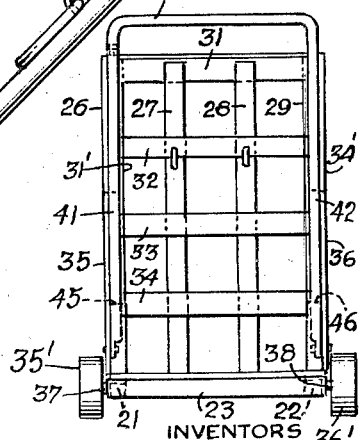
INVENTORS
John Henry Wentzien
Henry E. Brickner, and
Henry G. W. Acunfora, Jr.
ATTORNEY United States Patent Office 2,784,776
Patented Mar. 12, 1957

2,784,776

WHEEL MOUNTED GUARD FOR TIRE INFLATION

John Henry Wentzien, Englewood, Henry E. Brickner, Paramus, and Henry G. W. Acanfora, Jr., Englewood, N. J., assignors to The Borden Company, New York, N. Y., a corporation of New Jersey Application April 8, 1954, Serial No. 421,774

2 Claims. (Cl. 157—1)

The invention here presented is a safety device for the protection of automobile tire workers which prevents injury to a worker in the event that a tire breaks or disintegrates during the inflation operation, by the intervention of a suitable guard frame between the tire and the operator during the inflation procedure.

One of the more precarious and risky operations in the servicing of automotive equipment is the changing and inflation of tires. When a given tire casing has been damaged or has lived its useful life or for any other reason must be removed from the wheel, it is a simple operation to extract the valve stem and permit the air to exhaust from the inner tube whereupon it is a relatively simple operation to remove the casing and tube from the wheel, and it is almost as simple to place a new casing and tube on the same wheel. When, however, air under pressure is forced into the tube to prepare the tire for the road, a considerable danger arises. If there are defects in the casing, which is especially apt to occur when a used casing is replaced on a wheel, or if the baseband is defective, or if the casing is not properly seated on the wheel, when sufficient pressure is reached, the tire may burst or be blown off of the rim. This occurs only after from 20 to 30 pounds of pressure have been built up in the tire, and the result is that the mechanic who is placing the tire is in serious danger of severe injury or even death.

The present invention provides a stout grating shield having openings therein, suitable for convenient access to the tire, but with a sufficient number of vertical and horizontal bars in the grate to prevent any dangerously large flying objects from striking the operator.

The most dangerous items are the removable ring and the lock ring. These items under the impulse of 20 to 40 pounds air pressure are entirely capable of decapitating an operator (for which reason they can be very dangerous). The guard of the present invention is especially designed to catch these rings if they are dislodged by air pressure, and prevent injury to the operator. Similarly, a long tear in the fabric of the carcass, or separation of the cords in the carcass, may result in the dislodgment of a considerable sized fragment of tire which under pressures of 20 to 40 pounds per square inch may have sufficient impetus to break arms or ribs, disabling the operator for a considerable time. The grids of the present guard structure are designed to intercept any fragments or tire casing large enough to injure an operator to the extent of even temporarily disablement.

The guard of the present invention consists of a floor plate which may be a solid sheet of material such as steel or plank or may be an open frame-work within which the operator's feet may be placed. Attached to this platform member is a vertical portion consisting of at least three uprights and at least three horizontal members spaced far enough apart to give a rectangle having a width and height greater than the largest tire to be serviced. For most services, it is preferable that at least four vertical and horizontal bars be used.

Thus the device of the present invention permits a mechanic to mount and dismount tires under convenient circumstances and at the same time to be fully protected against the danger of mishap and the release of undue air pressure from a motor vehicle tire casing. Other objects and details of the present invention will be apparent from the following description, when read in connection with the accompanying drawings, wherein Figure 1 is a view in perspective of the device of the invention;

Figure 2 is a view in perspective of the device in use;

Figure 3 is a side view of an alternative embodiment; and

Figure 4 is an end view of the said alternative modification.

Referring to Figures 1 and 2, there are provided a pair of base members 1 and 2, preferably made of aluminum, which preferably take the form of channel shapes. Cross bars 4 and 5 also of channel shape are welded at opposite ends of the members 1 and 2, and a kneeling board 5' which may be of plywood or may be of diamond surfaced sheet metal is attached by bolts, or screws in the case of plywood, by welding, in the case of metal, to the basebars 1 and 2. Uprights 6, 7 and 8 are provided with their lower ends welded to the basebar assembly as shown in the figures. Horizontal cross bars 11 and 12 are likewise provided and preferably welded to the uprights 6, 7 and 8. In addition, strut members 14 and 15 are provided and welded at an angle respectively between the base members 1 and 2 and the uprights 6 and 8. By the use of relatively light gauge channel metal, especially aluminum channel bar, this structure is sufficiently light to be readily carried about by a mechanic. It is found to be essential that the structure be as light as possible, since the average mechanic will not make the effort to use a structure which is uncomfortably heavy to carry, but will use a structure which can be carried comfortably by one hand and can be kept near the coil of an air hose so as to be immediately usable whenever air is put into any tire.

In the operation of this device, the structure may be picked up with one hand by the operator, carried to the vehicle, the tires of which are being inflated, set in front of the tire, as shown in Figure 2, with the air hose in the operator's hands, passed through the space between the bars to the tire inflation valve. It will be observed that if a tire ring is blown off, or if a fragment of tire is dislodged, either will be caught by the protecting guard and the operator saved from injury thereby.

This simple structure is adequate protection for an operator on the ordinary passenger car or light truck tires, but is not always stout enough to protect an operator against injury from the very heavy, high pressure tires used on heavy trucks.

For this purpose the modification shown in Figure 3 is utilized. In this structure there are provided horizontal members 21 and 22 as in Figures 1 and 2 with cross bar members 23 and 24, likewise welded together and preferably formed of fairly heavy gauge steel channel bars. A kneeling plate 25, preferably diamond surfaced, is provided and welded to the upper sides of the channel bars 21, 22, 23 and 24. Uprights 26, 27, 28 and 29 are likewise provided, formed of channel bar or angle bar as desired, the channel bar being preferred because of the greater strength, the lower ends likewise being welded to the cross member 24. In addition, horizontal bars 31, 32, 33 and 34 are likewise provided and also welded to the uprights 26, 27, 28 and 29 as shown. The cross bars may also be of channel iron or they may alternatively be of angle iron or even of flat strap steel. Struts 35 and 36 are likewise provided and welded at an angle between the members 23 and 24 and the members 31' and 34'. Steel wheels 35' and 36' on axles 37 and 38 are desirably provided. These wheels may be so placed that they extend below the members 21 and 22 by a very small distance, a small fraction of an inch, or the axles may be placed in the center of the members 21 and 22, in which event an auxiliary channel bar 39 may be welded under the base members 21 and 22 to bring the kneeling plate into an approximately level position when in use.

A handle member is also provided formed of tube or angle bar members 41 and 42 with a cross bar member 43. This U-shaped handle is desirably pivoted on the strut members 37 and 38, but may alternatively be journaled on the base members 21 and 22. Stop members 45 and 46 in the form of inverted V's welded to the base members 21 and 22 are also conveniently provided to limit the travel of the handle member so that by a downward pressure on the handle member, the entire weight may be carried on the axles 37 and 38. A wrap-around chain 51 is likewise provided which may be passed between the wheel spokes, around the tire, and hooked to the grating as a still further protective item.

This structure, when made sufficiently strong to be adequate protection against large truck tires, is overly heavy to be carried by one hand, and, accordingly, it is designed to be wheeled about by one hand.

In the operation of this device, the operator may grasp the handle member 43, and downward pressure will then over-balance the weight of the guard uprights, lifting the front end off the floor, whereupon the device may conveniently be trundled across the garage floor and easily and conveniently spotted alongside of a truck tire which is to be inflated. Release of the operator's grip on the handle then drops the front edge under the uprights onto the garage floor and the weight holds the structure firmly in position. The handle may then be folded up toward the members 31, 32, 33 and 34 whereupon the operator may conveniently kneel on the kneeling plate 25 and by passing the air hose through the openings in the upright grid, the air is conveniently delivered to the tire valve for inflation of the tire. If, during the inflation operation, any members of the tire break loose under the pressure of the air, they will be caught by the grid and prevented from reaching the operator who is thereby adequately protected.

The device of the invention thus provides an adequate protection to an operator during the inflation of a tire against any loose or flying pieces of tire structure which may be dislodged or impelled by air pressure in the tire.

While there are above disclosed but a limited number of embodiments of the present invention, it is possible to provide still other embodiments without departing from the inventive concept herein disclosed, and it is therefore desired that only such limitations be imposed upon the appended claims as are stated therein or required by the prior art.

The invention claimed is:

1. A portable tire inflation protector comprising in combination a horizontal frame including lengthwise members and a transverse kneeling board at one end thereof, a single pair of wheels positioned adjacent to said kneeling board and mounted on the said frame, an upright frame attached to the horizontal frame at the opposite end from the said wheels, diagonal struts between said horizontal frame and said upright frame and a handle attached pivotally to said diagonal struts and adapted to serve as means for wheeling the entire structure about the floor and alternatively to fold up against the upright frame to increase the protective barrier.

2. A portable tire inflation protector comprising in combination a horizontal frame including lengthwise members and a transverse kneeling board at one end thereof, a single pair of wheels positioned adjacent to said kneeling board and attached to said frame, an upright frame attached to the horizontal frame at the opposite end from the said wheels, diagonal struts between said base frame and said upright frame, a handle attached pivotally to said diagonal struts and adapted to serve as means for wheeling the entire structure about the floor and alternatively to fold up against the upright member to increase the protective barrier, and a chain member attached to said upright frame adapted to hold the said protector to the tire to be inflated.

References Cited in the file of this patent
UNITED STATES PATENTS

| | | |
|---|---|---|
| 1,394,493 | Grazer | Oct. 18, 1921 |
| 1,544,356 | Spaeth | June 30, 1925 |
| 2,318,059 | Cooper | May 4, 1943 |
| 2,345,458 | Caron | Mar. 28, 1944 |
| 2,407,049 | Winarsky et al. | Sept. 3, 1946 |
| 2,435,893 | Mall | Feb. 10, 1948 |